United States Patent [19]
Coccoli et al.

[11] Patent Number: 4,796,968
[45] Date of Patent: Jan. 10, 1989

[54] SINGLE-MODE OPTICAL-FIBER DIRECTIONAL COUPLER

[75] Inventors: Joseph D. Coccoli, Sudbury; John R. Stemniski, Swampscott; Donato Cardarelli, Westwood, all of Mass.

[73] Assignee: The Charles Stark Draper Laboratory, Inc., Cambridge, Mass.

[21] Appl. No.: 869,315

[22] Filed: Jun. 2, 1986

[51] Int. Cl.⁴ .............................................. G02B 6/26
[52] U.S. Cl. ................................. 350/96.15; 156/663
[58] Field of Search ............... 350/96.15, 96.16, 96.34; 156/663

[56] References Cited

U.S. PATENT DOCUMENTS

| 4,264,126 | 4/1981 | Sheem | 350/96.15 |
| 4,511,209 | 4/1985 | Skutnik | 350/96.15 X |
| 4,523,810 | 6/1985 | Goss et al. | 350/96.15 X |
| 4,564,417 | 1/1986 | Schoen et al. | 156/663 X |

OTHER PUBLICATIONS

*American Heritage Dictionary*, 2nd College Edition, Houghton Mifflin Co. (Boston), 1982, p. 1392.
Liao et al., "Single-Mode Fiber Coupler", *Applied Optics*, vol. 20, No. 15, Aug. 1981, pp. 2731-2734.
Tran et al., "Single-Mode Fiber Directional Couplers Fabricated by Twist-Etching Techniques (Stabilization)", *IEEE Journal of Quantum Electronics*, vol. QE-17, No. 6, Jun. 1981, pp. 988-991.
Bergh et al., "Single-Mode Fibre Optic Directional Coupler", *Electronics Letters*, vol. 6, No. 7, Mar. 1980, pp. 260-261.

*Primary Examiner*—John D. Lee
*Attorney, Agent, or Firm*—Joseph S. Iandiorio; Brian M. Dingman

[57] ABSTRACT

A single-mode optical-fiber directional coupler including at least two optical fibers each having a core surrounded by a cladding material and having a region of reduced cladding diameter contiguous with a reduced-cladding diameter region of the other fiber throughout the length of an optical interaction area. Each reduced-cladding-diameter region is bounded on each end by a tapered region which gradually increases in diameter as it extends away from the reduced-cladding-diameter region toward a full-diameter region of each fiber. There is also a substrate and means for securing the reduced-cladding-diameter region to the substrate, means for supporting the fibers in their full-diameter region beyond each end of the optical interaction area, means for fastening the support means to the substrate and a medium surrounding the reduced-diameter regions and having an index of refraction similar to that of the cladding material. This invention also features a method of making such a directional coupler involving temperature gradients in temperature sensitive etchant placed along portions of the cladding areas of at least two optical fibers.

29 Claims, 4 Drawing Sheets

SINGLE-MODE OPTICAL-FIBER DIRECTIONAL COUPLER

FIELD OF INVENTION

This invention relates to a low-loss, single-mode, optical-fiber, directional coupler and more particularly to a torsionless, wrapped, gradually-tapered-junction, directional coupler and to a method of fabricating such a directional coupler by etching.

BACKGROUND OF INVENTION

A single-mode, optical-fiber directional coupler couples a preselected fraction of the optical power from the single-mode guided radiation of the input optical fiber into the single-mode guided radiation of the output fibers to which it is coupled. A typical single-mode optical fiber consists of two concentric glass layers, the inner core layer being several microns in diameter and having one optical index of refraction and the outer concentric cladding layer having a second optical index of refraction. The cladding is in turn encased in a concentric protective, opaque jacket. The optical power flowing through the fiber is confined, by the diffracting-lens effect of the differences in indices of refraction, primarily within the center of the fiber to a radial distance no more than one or two core radii from the center of the fiber. Coupling is achieved by reducing the diameter of the cladding of each of two or more parallel fibers to bring the cores of the fibers closer to each other so that their modes overlap as desired.

Presently, the three most common types of single-mode, optical-fiber directional couplers are the lapped coupler, the biconical-tapered fused coupler, and the etched-cladding coupler. The lapped coupler is fabricated by imbedding an optical fiber in a channel in each of two separate quartz blocks. The blocks are lapped and polished until the cladding on the upper surface of each fiber is removed to the desired proximity to the cores. The two blocks are then pressed together to produce a parallel contact between the flat lapped surfaces of the two fibers. Sliding and rotating the two blocks tunes the degree of coupling. The lapping method can be used to produce good low-loss, relatively-thermally-insensitive, directional couplers but is costly to fabricate and results in a large, bulky coupler that is susceptible to misalignment in dynamic environments. The lapping method is limited to coupling between two fibers.

The biconical-tapered fused coupler is fabricated by first fusing two parallel fibers over a specified length at the softening temperature of the glass. The fibers are drawn under tension to reduce their diameters in the center of the fused region by 10–20% which results in a taper in diameter from the center toward the ends. The core of each fiber is itself reduced by 10–20% in diameter which weakens the diffracting-lens effect which results in a radially expanded region of confinement of the optical power such that a portion of the optical power is flowing in one or more of the guidance modes of the cladding. The cladding guidance modes in the input fiber overlaps the cladding guidance modes of the output fiber and a fraction of the optical power in the input fiber is thereby coupled to the output fiber. As the optical power propagates along the expanding tapers at the output ends of the coupler, it adiabatically redistributes from the cladding guidance modes back to the core guidance single mode at the output end of each fiber.

The fused coupler has higher surface loss and loss from scattering centers within the cladding than lapped couplers and is highly sensitive to thermal and mechanical changes. Small imperfections in the claddings of both the input and output fibers upset the condition of adiabatic redistribution and lead to excessive radiation losses from these couplers. These types of couplers are very lossy compared to a typical lapped coupler. The biconical tapered coupler is not necessarily limited to two fibers.

Etched couplers are fabricated by removing the fiber jackets in the desired coupling region of several fibers and etching the claddings of the several optical fibers in the desired coupling region with hydrofluoric acid to reduce the diameters of the claddings of each of the fibers. The transition is usually abrupt from the etched region to the unetched region, usually located at the transition from jacketed to unjacketed fiber. The etched regions of the several fibers are brought into parallel contact and the contacting fibers are imbedded in a material that both matches the optical index of refraction of the cladding material and gives support and strength to the optical fibers.

There are both direct optical effects and mechanically induced optical effects associated with the abrupt transition from the diameter in the etched to the diameter in the unetched region. The etched coupling region of each fiber is usually less than $10\mu$ in diameter so that a stress applied to the fiber causes a relatively sharp bend in the fiber at the transition point. Because lateral stress is required to bring the etched fibers into contact along the optical interaction segment, these undesirable sharp bends can be produced in the fibers at the transition points; as much as 40% of the incident optical power may be observed radiating from the abrupt transition region. Stress itself also changes the index of refraction in the transition area, causing additional optical mismatches between the guidance modes of the unetched and etched fiber regions, which produces further radiation loss.

SUMMARY OF INVENTION

It is therefore an object of this invention to provide an improved single-mode optical-fiber directional coupler.

It is a further object of this invention to provide such a directional coupler which is inexpensive to produce.

It is a further object of this invention to provide coupling between two or more optical fibers.

It is a further object of this invention to provide such a directional coupler which has low radiation loss.

It is a further object of this invention to provide such a directional coupler which is resistant to vibration and other external stress.

It is a further object of this invention to provide such a directional coupler which is simple to fabricate.

Yet another object of this invention is to provide such a directional coupler which is small in size.

This invention results from the realization that a truly effective low-loss, single-mode, directional coupler can be achieved by holding several optical fibers in a support whose perimeter circuits areas of exposed cladding of the fibers and by selectively applying differential temperature gradients to a temperature-sensitive etchant surrounding the exposed cladding areas to produce regions of gradual taper expanding in diameter with distance away from central reduced-cladding-diameter regions.

This invention features an improved single-mode optical-fiber directional coupler and method of making the same. The method includes placing next to each other the exposed cladding area of each of at least two optical fibers, mounting the fibers at either end of the exposed areas on a support with the exposed areas suspended between, applying a temperature-sensitive etchant to the exposed cladding areas, and establishing thermal gradients in the etchant by differentially heating the etchant with a greater temperature along the center portion of the exposed cladding areas and lower temperature toward the ends of the exposed cladding areas to obtain for each fiber a reduced-diameter region along the center portion that is bounded by tapered regions, each tapered region increasing in diameter as it extends away from the reduced-diameter region. After etching, the fiber is separated from the etchant and the support is provisionally mounted on a substrate. Desired lengths of the exposed, etched cladding areas are engaged and tensioned to align the fibers, the exposed, etched cladding areas are fixed to the substrate proximate each end of the desired length, the support is attached to the substrate, and the exposed, etched cladding areas are embedded in a medium having an index refraction similar to that of the cladding. This invention also features the directional coupler made according to this method.

In one embodiment, placing next to each other the optical fibers may include placing the exposed cladding areas mutually in contact. Placing next to each other may also include wrapping the fibers around each other such as where no torsional twist is imparted to the fibers during the wrapping and each fiber is wrapped at least 180° around the other fiber. The support may circuit the exposed cladding areas and may be formed of optical adhesive set by exposure to selected radiation. Corresponding portions of the exposed cladding areas may experience the same thermal conditions during the differential heating of the etchant and the substrate may be quartz.

After differential heating and separation of the etchant from the fibers, this invention further features provisionally mounting the support on a substrate, attaching to the substrate the center of the support proximate the exposed cladding areas, detaching first and second ends of the support from the center of the support proximate the exposed cladding areas, and fixing near the first end of the support the exposed cladding areas to the substrate at a first location. The first end of the support is positioned to align the exposed areas between the first fixation location and the first end; the first end of the support is attached to the substrate. The second end of the support is adjusted to tension and contact the reduced-diameter regions, the exposed cladding areas near the second end of the support are fixed to the substrate at a second location, and the second end of the support is positioned to align the exposed areas between the second fixation location and the second end. The second end of the support is attached to the substrate and the exposed cladding areas are embedded in a medium having an index refraction similar to the cladding.

The first and second ends of the support may be positioned to minimize bending of and stress on each of the fibers. The medium surrounding the exposed area may be a liquid having an index of refraction within 0.0005 of the index of refraction of the cladding; surrounding the exposed area includes establishing a liquid-type circuit from the first and second ends and the center of the support around the exposed cladding areas. A cover composed of a material such as quartz may be mounted on the surface of the support opposite the surface of the support which is attached to the substrate.

This invention also features a single-mode optical-fiber directional coupler including at least two optical fibers each having a core surrounded by a cladding material and having a region of reduced cladding diameter contiguous with a reduced-cladding-diameter region of the other fiber throughout the length of an optical interaction area, each reduced-cladding-diameter region being bounded on each end by a tapered region which gradually increases in diameter as it extends away from the reduced-cladding-diameter region toward a full-diameter region of each fiber. There is also a substrate and means, located near each end of the optical interaction area, for securing the reduced-cladding-diameter region to the substrate. There are means for supporting the fibers in their full-diameter regions beyond each end of the optical interaction area, means for fastening the support means to the substrate, and a medium surrounding the reduced-diameter regions and having an index of refraction similar to that of the cladding material.

In a preferred embodiment, corresponding portions of the fibers have the same diameters throughout the length of the optical interaction area and corresponding portions of the fibers have the same diameters throughout the length of the tapered regions. The core of each fiber may be of uniform diameter throughout the tapered regions and the reduced-cladding-diameter regions.

DISCLOSURE OF PREFERRED EMBODIMENT

Other objects, features and advantages will occur from the following description of a preferred embodiment and the accompanying drawings, in which.

The invention may be accomplished by a single-mode directional coupler which has at least two optical fibers each having within an exposed, unjacketed cladding area a central reduced-cladding-diameter coupling region bounded on each end by a gradually tapered region. The fibers are held by a thin membrane support in their full-diameter regions; the support and the junction of fibers are secured to a substrate and the fibers are embedded in and contiguous with, over their entire surfaces, an optically matching material.

The method according to this invention of making such a directional coupler involves supporting the fibers in a temperature-sensitive etchant in which a temperature gradient is sustained along the fibers during etching, aligning the fibers after etching to avoid sharp bends, and securing the fibers in their aligned position. The entire etched portions of the fiber assembly, both the central and the tapered regions, are then surrounded by a medium having an index of refraction similar to that of the cladding. For convenience of manufacture and to reduce fiber breakage, the membrane which supports the fibers during etching also assists during fiber alignment and in addition is incorporated into the completed coupler.

Figure 1:
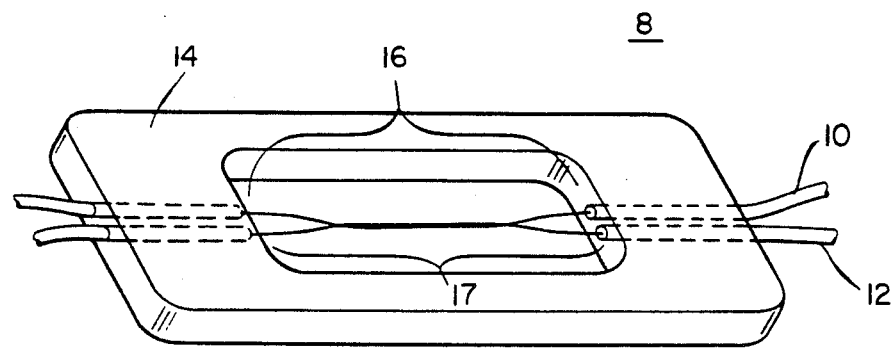
FIG. 1 is a schematic axonometric view of a fiber assembly having a pair of wrapped optical fibers held by a thin membrane support according to this invention.

Fiber assembly 8 is shown in FIG. 1 having optical fibers 10, 12 held by molded thin membrane support 14 which circuits exposed, unjacketed cladding segments within areas 16, 17 of fibers 10, 12, respectively. Support 14, a molded thin membrane, is designed to hold fibers 10, 12 during their etching by a temperature-sensitive etchant; support 14 should be composed of a material that is resistant to the etchant, e.g., Norland Optical Adhesive No. 61. Also, support 14 should not by virtue of its thermal expansion apply excessive tension to fibers 10, 12 during etching: breakage of the fibers because of thermal expansion of support 14 should be avoided as described below. The design of support 14 permits easy access for inspection of exposed areas 16, 17 before and after etching.

In one method of preparing fibers 10, 12 for etching, the jacket of each fiber is stripped from a two-inch segment to expose the bare glass cladding beneath it. Some jackets are easily stripped using concentrated $H_2SO_4$ while others can be stripped using 1,1,1,-trichloroethane. Fibers 10, 12 are taped with adhesive tape side-by-side to a surface lightly coated with mold release such as VYDAX 1000 or similar fluorotelomer suspended in 1,1,2-trichlorotrifluorethane available from DuPont or MS-122 available from Miller-Stephenson. Fibers 10, 12 are wrapped gently around each other without placing torsional twists on either fiber. The absence of twisting of fibers 10, 12 is especially important when polarized light is to be passed through the coupler. The term wrapping is intended to include braiding or other placement of two or more fibers in contact with each other without twisting the fibers.

To produce support 14, an optical adhesive such as Norland Optical adhesive No. 61 is puddled around the jacketed portions of fibers 10, 12 until a thin, roughly rectangular area bordered by the liquid puddle circuits the unjacketed-cladding segments within areas 16 and 17. The bordering adhesive puddle is solidified by exposure to ultraviolet (UV) radiation for approximately 30 seconds and is cured by continued UV exposure for several hours to produce the support. When the support is released from the surface, fiber assembly 8 is produced.

Figure 2:
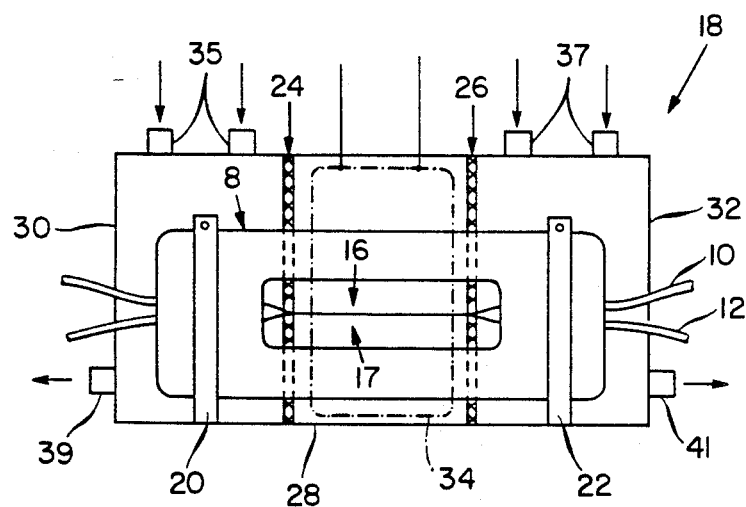
FIG. 2 is a top plan view of the fiber assembly of FIG. 1 mounted on a differential heating device during fiber etching.

Fiber assembly 8 is then secured by clamps 20, 22 to the differential heating apparatus 18, FIG. 2, before immersion in a temperature-sensitive etchant. It is important that the block be heated to the correct 60° C. temperature during attachment to avoid stress from thermal expansion during etching. Heating apparatus 18 is a bonded structure of three aluminum blocks with thermal insulators 24, 26 separating block 28 from blocks 30 and 32, respectively. The exposed surfaces of the three bonded blocks are coated with a thin layer of Teflon to protect them from the etchant. Electrical heater 34, shown in phantom, is embedded in central block 28; water flow is provided to inlets 35, 37 and exits at ports 39, 41 to cool blocks 30, 32, respectively.

The upper surface of heating assembly 18 is slightly convex to induce a slight bowing of support 14 which in turn applies a slight tension to fibers 10, 12 so that the fibers remain against heating assembly 18, which during etching produces well-defined thermal gradients and uniform central temperatures in the etchant disposed along the fibers. It is desirable for unjacketed cladding within areas 16 and 17 to remain wholly within the region of thermal gradients extending across each insulator strip 24 and 26 of heating assembly 18.

Figure 3:
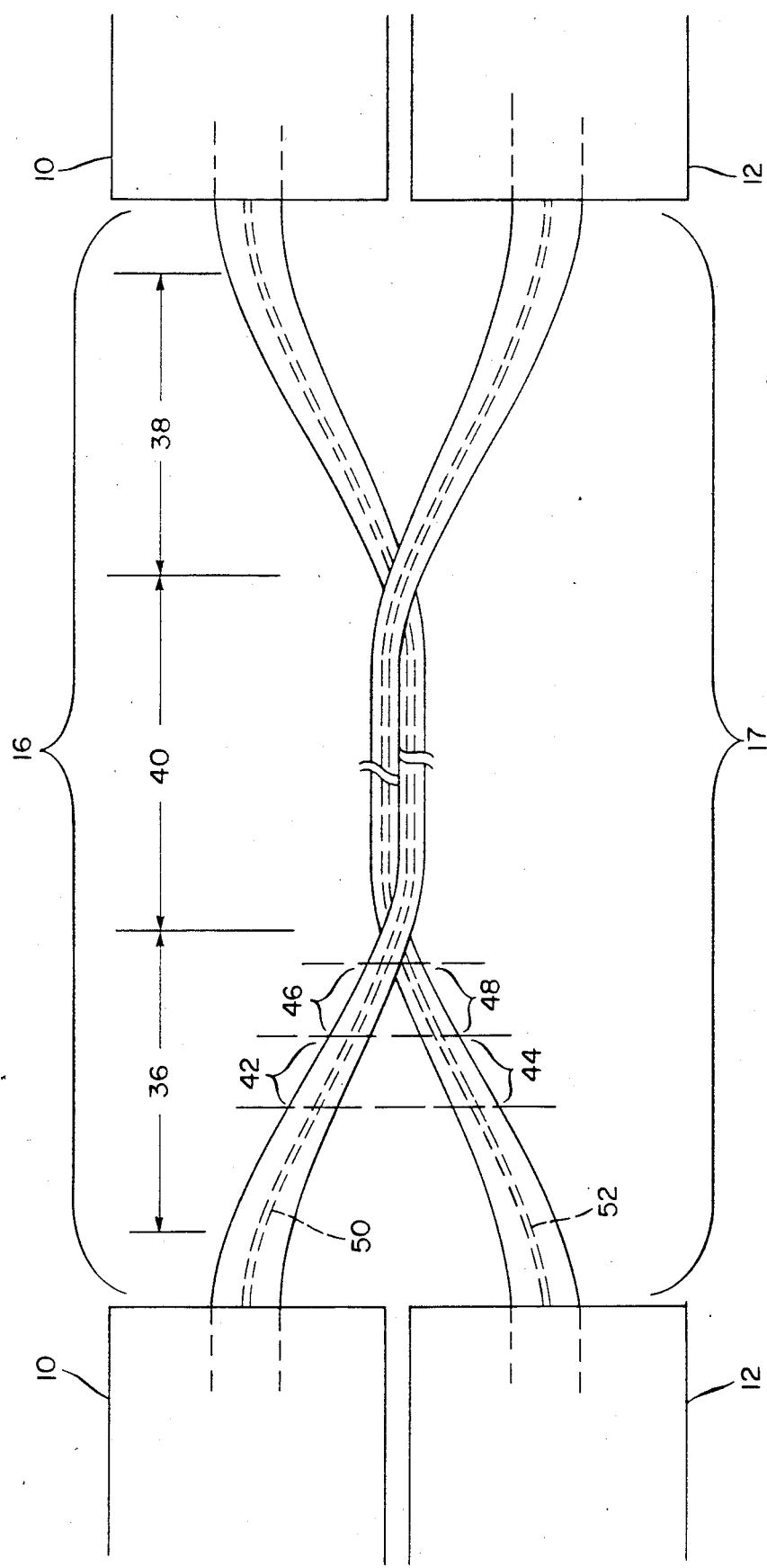
FIG. 3 is a top plan view of the exposed cladding area of each of two optical fibers wrapped around each other and tapered by etching according to this invention.

Heating apparatus 18 with attached fiber assembly 8 are then placed in a bath of 5% hydrofluoric acid buffered with ammonia at a temperature of 50°-55° C. Central heated block 28 is maintained at 60° C. by heater 34 while water cooled blocks 30, 32 are maintained at 40°-45° C. Under this temperature regime, the unjacketed cladding within areas 16 and 17 of fibers 10, 12, respectively, will etch at a rate of approximately 1 micron per minute next to the heated block 28 while the unjacketed cladding over cooled blocks 30, 32 will etch at a rate less than 0.5 microns per minute. Etching rates increase at higher temperatures. The etching rate thus increases along the surface of heating assembly 18 toward the center of the unjacketed-cladding segments at 60° C. which produces tapered regions 36, 38, FIG. 3, extending away from central reduced-cladding-diameter region 40; fibers 10, 12 are shown wrapped 180° about each other in approximately the position they will occupy in the completed coupler. Corresponding portions of fibers 10, 12 have the same diameters: for example, unjacketed cladding areas 16 and 17 within portion 42 and portion 44, respectively, have the same increasing diameters as they extend away from central region 40; the increasing diameter within portion 46 matches that within portion 48. The cladding surrounding cores 50, 52 in central region 40 is typically reduced to within several core radii of the center of cores 50, 52.

Figure 4:
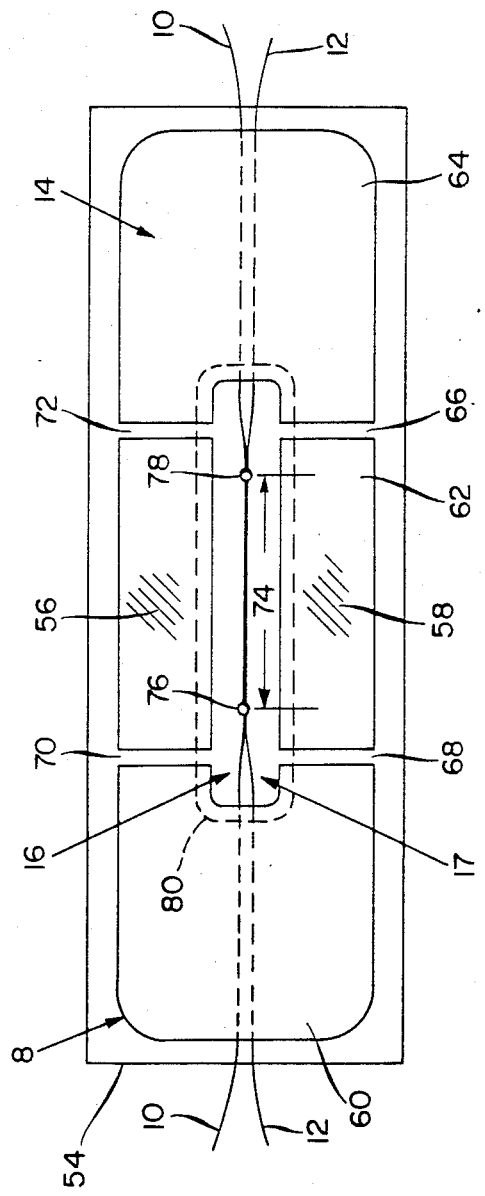
FIG. 4 is a schematic axonometric view which shows the fiber assembly of FIG. 1 after etching provisionally mounted on a substrate during fiber alignment.

Whether before etching fibers 10, 12 are positioned such that the portions of their unjacketed-cladding segments within areas 16 and 17 are simply placed near to each other, or are actually placed in contact with each other and wrapped together, desired central region lengths and unjacketed tapered cladding portions within areas 16 and 17 must be engaged and tensioned after etching to provide the desired optical interaction area. One procedure for aligning fibers 10, 12 is indicated in FIG. 4. Fiber assembly 8 is placed on a substrate 54 of the same material as the cladding of the optical fiber, e.g., quartz, after a film of liquid optical adhesive is disposed on substrate 54 to underlie support 14 but not exposed cladding areas 16, 17. Quartz is usually preferred for both substrates 54 and top plate 84 because it matches the thermal coefficient of expansion of most optical fibers. Support 14 is tacked to substrate 54 at only locations 56, 58 using a UV radiation spot lamp to harden the liquid adhesive. Support 14 is separated into three sections 60, 62, 64 by using a sharp instrument to sever support 14 to produce gaps 66, 68, 70 and 72. The surface tension of the liquid optical adhesive restrains ends 60 and 64 of support 14 while allowing the ends to be slid over substrate 54 during fiber alignment.

After selecting the desired length of optical interaction area 74, microdot 76 of optical adhesive is placed at one end of interaction length 74 and is hardened with the UV spotlight. End 60 is then adjusted along substrate 54 to balance the bending of and stress on each of fibers 10, 12 between microdot 76 and end 60. When properly positioned end 60 is affixed to substrate 54 using a UV spotlight. Microdot of optical adhesive 78 may be placed on one of the fibers (which is under slight tension) and tension on the second fiber is then adjusted using end 64; alternatively, end 64 is manipulated to contact and tension fibers 10, 12 along interaction length 74 after which a microdot of optical adhesive 78 is applied to both fibers and set with the UV light. End 64 is then adjusted to align fibers 10, 12 between microdot location 78 and end 64 such that the fibers are not in contact in this region and have gentle bends along their tapered regions. The order of these steps is unimportant as long as fibers 10, 12 contact each other without gaps along length 74 and do not contact outside of this region.

After alignment, gaps 66, 68, 70 and 72 are filled with optical adhesive and hardened to form liquid-tight circuit 80 from ends 60, 64 and center 62; circuit 80 passes about the unjacketed-cladding areas 16, 17. Unjacketed-cladding areas 16, 17 are then surrounded with a material (e.g., index matching fluid supplied by a supplier such as Cargill Labs) which has an index refraction similar to that of the cladding and preferably within 0.0005 of the cladding.

Figure 5:
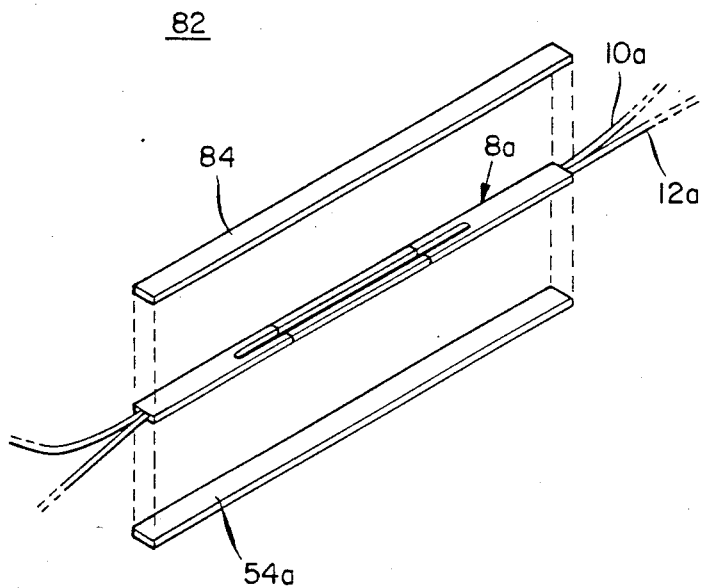
FIG. 5 is an exploded axonometric view of a completed single-mode optical-fiber directional coupler fabricated according to this invention.

Completed directional coupler 82 is shown in expanded form in FIG. 5. Fiber assembly 8a is mounted on quartz bottom plate 54a after fiber etching for alignment as previously described and is covered by plate 84 after embedding the aligned fibers in the index matching fluid as previously described. Typical plates 54a, 84 are approximately 1/16" thick, ¼" wide, and 3" long and assembly 8a is 1/32" thick.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A method of making a single-mode optical-fiber directional coupler comprising:
    placing next to each other the exposed cladding area of each of at least two optical fibers;
    mounting the fibers at each end of the exposed areas in a support with the exposed areas suspended between;
    applying a temperature-sensitive etchant to the exposed cladding areas;
    differentially heating the etchant with higher temperature along the central portion of the exposed cladding areas and lower temperature toward the end portions of the exposed cladding areas to obtain for each fiber a reduced-diameter region along the central portion that is bounded by tapered regions, each tapered region increasing in diameter as it extends away from the reduced-diameter region;
    separating the fibers from the etchant;
    provisionally mounting the support on a substrate;
    engaging and tensioning the desired lengths of the exposed, etched cladding areas to align the fibers;
    fixing the exposed, etched cladding areas to the substrate proximate each end of the desired length;
    attaching the support to the substrate; and
    embedding the exposed, etched cladding areas in a medium having an index of refraction similar to that of the cladding.

2. The method of claim 1 in which placing next to each other the optical fibers includes placing the exposed cladding areas mutually in contact.

3. The method of clam 2 in which placing next to each other the optical fibers includes wrapping the fibers around each other.

4. The method of claim 3 in which no torsional twisting is produced in the fibers during the wrapping.

5. The method of claim 3 in which each fiber is wrapped at least 180 degrees around the other fiber.

6. The method of claim 1 in which the support circuits the exposed cladding areas.

7. The method of claim 6 in which the support is formed of optical adhesive set by exposure to selected radiation.

8. The method of claim 1 in which corresponding portions of the exposed cladding areas experience the same thermal conditions during the differential heating of the etchant.

9. The method of claim 1 in which the substrate is composed of quartz.

10. The directional coupler made according to the method of claim 1.

11. A method of making a single-mode optical-fiber directional coupler comprising:
    placing next to each other the exposed cladding area of each of at least two optical fibers;
    mounting the fibers at each end of the exposed areas in a support with the exposed areas suspended between;
    applying a temperature-sensitive etchant to the exposed cladding areas;
    differentially heating the etchant with higher temperature along the central portion of the exposed cladding areas and lower temperature toward the end portions of the exposed cladding areas to obtain for each fiber a reduced-diameter region along the central portion that is bounded by tapered regions, each tapered region increasing in diameter as it extends away from the reduced-diameter region;
    separating the fibers from the etchant;
    provisionally mounting the support on a substrate;
    attaching to the substrate the center of the support proximate the exposed, etched cladding areas;
    detaching first and second ends of the support from the center of the support proximate the exposed, etched cladding areas;
    fixing near the first end of the support the exposed, etched cladding areas to the substrate at a first location;
    positioning the first end of the support to align the exposed, etched areas between the first fixation location and the first end;
    attaching the first end of the support to the substrate;
    adjusting the second end of the support to tension and contact the reduced-diameter regions;
    fixing near the second end of the support the exposed, etched cladding areas to the substrate at a second location;
    positioning the second end of the support to align the exposed, etched areas between the second fixation location and the second end;
    attaching the second end of the support to the substrate; and
    embedding the exposed, etched cladding areas in a medium having an index of refraction similar to that of the cladding.

12. The method of claim 11 in which the first and second ends of the support are positioned to minimize bending of and stress on each of the fibers.

13. The method of claim 11 in which the exposed cladding areas is surrounded with a liquid having an index of refraction similar to the index of refraction of the cladding.

14. The method of claim 13 in which the liquid has an index of refraction that is within 0.0005 of the index of refraction of the cladding.

15. The method of claim 13 in which embedding the exposed, etched areas includes establishing a liquid-tight circuit from the first and second ends and the center of the support around the exposed, etched cladding areas.

16. The method of claim 15 further including mounting a cover on the surface of the support opposite the surface of the support which is attached to the substrate.

17. The method of claim 16 in which the cover is composed of quartz.

18. The directional coupler made according to the method of claim 11.

19. A single-mode optical-fiber directional coupler comprising:
 at least two optical fibers each having a core surrounded by a cladding material and having a region of reduced cladding diameter contiguous with a reduced-cladding-diameter region of the other said fiber throughout the length of an optical interaction area, each said reduced-cladding-diameter region being bounded on each end by a tapered region which gradually increases in diameter as it extends away from said reduced-cladding-diameter region toward a full-diameter region of each said fiber, said optical fibers gently wound about each other without torsional twisting in their reduced-cladding-diameter region;
 a substrate;
 means, located near each end of said optical interaction area, for securing said reduced-cladding-diameter region to said substrate;
 means for supporting said fibers in their full-diameter regions beyond each end of said optical interaction area, said means for supporting circuiting said optical interaction area to define a void encompassing said optical interaction area;
 means for fastening said support means to said substrate; and
 a medium, disposed within said void, surrounding said reduced-diameter regions and having an index of refraction similar to that of the cladding material.

20. The single-mode optical fiber directional coupler of claim 19 in which each said fiber is wrapped at least 180 degrees around the other fiber or fibers.

21. The single-mode optical fiber directional coupler of claim 19 in which said means for supporting is formed of optical adhesive.

22. The single-mode optical fiber directional coupler of claim 19 in which, throughout the length of said optical interaction area, corresponding portions of said fibers have the same diameters.

23. The single-mode optical fiber directional coupler of claim 22 in which corresponding portions of said fibers have the same diameters throughout the length of said tapered regions.

24. The single-mode optical fiber directional coupler of claim 19 in which the core of each said fiber is of uniform diameter throughout said tapered regions and said reduced-cladding-diameter region.

25. The single-mode optical fiber directional coupler of claim 19 in which said substrate is quartz.

26. The single-mode optical fiber directional coupler of claim 19 further including a cover mounted on the surface of said support means opposite the surface of the support means which is fastened to said substrate.

27. The single-mode optical fiber directional coupler of claim 26 in which said cover is quartz.

28. The single-mode optical fiber directional coupler of claim 19 in which said medium is a liquid having an index of refraction within 0.0005 of the index of refraction of said cladding material.

29. The single-mode optical fiber directional coupler of claim 19 in which said means for securing said reduced-cladding-diameter regions is located at each end of said optical interaction area.

* * * * *